Figure 1:
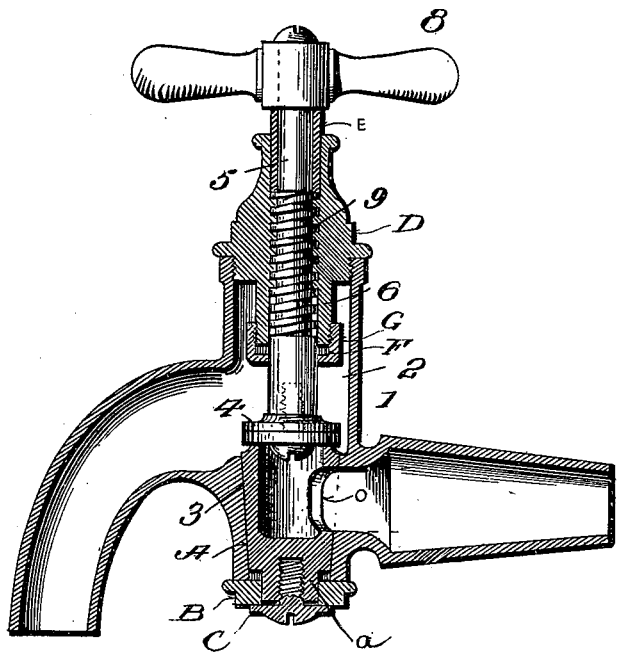

No. 667,109. Patented Jan. 29, 1901.
E. L. WALTER.
FAUCET.
(Application filed Apr. 28, 1900.)

(No Model.) 2 Sheets—Sheet 1.

Inventor
Edwin L. Walter
by R. W. & A. Lacey his attorneys

Witnesses

No. 667,109. Patented Jan. 29, 1901.
E. L. WALTER.
FAUCET.
(Application filed Apr. 28, 1900.)
(No Model.) 2 Sheets—Sheet 2.
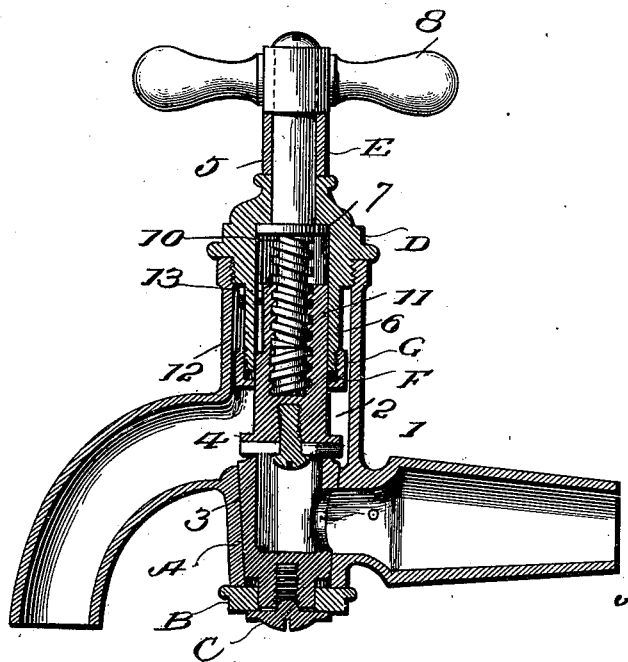
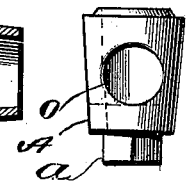
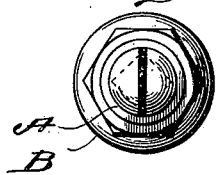
Witnesses.
Jno. Munie
H. J. Hartman
Inventor.
Edwin L. Walter
by R.S.&A.A. Lacey his Attorneys
THE NORRIS PETERS CO., PHOTO-LITHO., WASHINGTON, D. C.

UNITED STATES PATENT OFFICE.

EDWIN L. WALTER, OF SCRANTON, PENNSYLVANIA.

FAUCET.

SPECIFICATION forming part of Letters Patent No. 667,109, dated January 29, 1901.

Application filed April 28, 1900. Serial No. 14,753. (No model.)

*To all whom it may concern:*

Be it known that I, EDWIN L. WALTER, a citizen of the United States, residing at Scranton, in the county of Lackawanna and State of Pennsylvania, have invented certain new and useful Improvements in Faucets; and I do hereby declare the following to be a full, clear, and exact description of the invention, such as will enable others skilled in the art to which it appertains to make and use the same.

It is a matter of common knowledge that faucets, valves, and like contrivances for controlling the flow of fluids and liquids require packing at intervals to prevent leak and waste. Such faucets when applied to a water-distributing system in a house, building, or like structure cannot be packed by the average person without shutting off the water at the stop-cock, and thereby throwing a part or the entire system out of action during the interim of shutting down and turning on the water and which is the cause of serious inconvenience and annoyance.

This invention provides a faucet, valve, cock, or like contrivance for controlling fluids and liquids in any system of pipes or fixtures for any purpose and in any location and which will admit of packing without cutting off the flow from any other faucet or cock in the system and which will protect the screw-joint from the action of the fluid or liquid passing through the faucet and admit of lubrication thereof, whereby the life or period of usefulness of the device is materially prolonged.

The invention is applicable to all styles of compression-valves, faucets, cocks, and the like for bath-tubs, closets, pantries, kitchens, and water and steam fixtures generally, although shown in connection with a faucet of ordinary construction.

The invention consists of the novel features, details of construction, and combination of the parts, which hereinafter will be more fully disclosed and finally claimed, and for this purpose and also to acquire a knowledge of the merits of the invention and the structural details of the means whereby the results are attained reference is to be had to the appended description and the drawings hereto attached.

While the essential and characteristic features of the invention are necessarily susceptible of modification, still the preferred embodiment of the invention is illustrated in the accompanying drawings, in which—

Figure 2:
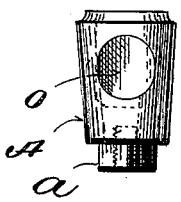
Figure 3:
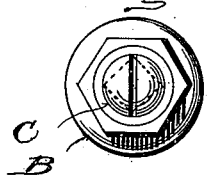
Figure 4:
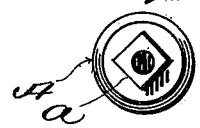

Figure 1 is a vertical central longitudinal section of a faucet, showing the application of the invention. Fig. 2 is a detail view, in elevation, of the removable plug-valve. Fig. 3 is a view of the outer or lower end of the plug-valve, showing the washer in position. Fig. 4 is a view similar to Fig. 3 with the washer and its securing means removed. Fig. 5 is a view similar to Fig. 1, showing the application of the invention to a different type of faucet. Figs. 6, 7, and 8 are detail views of the plug-valve and correspond with, respectively, Figs. 2, 3, and 4.

Corresponding and like parts are referred to in the following description and indicated in all the views of the drawings by the same reference characters.

The casing, shell, or body 1 may be of any style, depending upon the design and pattern of faucet and like contrivance to which the invention is applied, and comprises a valve-chamber 2, in which the vitals or operating parts are located. The lower end of the valve-chamber is made tapering, as shown at 3, to receive a tapering plug-valve A, which is fitted therein from the upper end of the valve-chamber. This plug-valve is hollow and is provided in one side with an opening O for the admission of the fluid or liquid intended to be controlled by the faucet. The plug-valve is fitted to the lower tapering portion of the valve-chamber by a ground joint, so as to be water and steam tight. The upper end of the part A constitutes a seat for the valve 4, controlled by the stem 5 in the well-known manner. The lower end of the plug-valve is formed with an extension *a* of angular formation in cross-section, and to which is fitted a washer B, having an angular portion to receive a wrench or spanner for forcibly turning the plug-valve when it is required to shut off the water or fluid, and when it is required to pack the valve or to regulate the flow when the service-pipe is under excessive pressure. The washer B is prevented from turning upon the part *a* and is held in place by a screw or like fastening C, fitted into a threaded opening formed in the lower end of the part A.

The upper end of the valve-chamber is closed by a cap D, which is apertured for the passage therethrough of the stem 5 and is provided with a pendent extension 6 of tubular formation to receive a packing-gland G, in which is fitted a packing F, so as to provide a tight joint to exclude foreign matter from reaching the screw-joint, by means of which the valve 4 is seated and unseated. In the type shown in Fig. 1 the stem 5 has a threaded portion which makes direct screw-thread connection with an intermediate portion of the cap or closure D, the end portions of the bore or opening of the cap D being enlarged to provide ample clearance for the screw-threaded portion of the stem 5. A sleeve E is fitted upon the upper portion of the stem 5 and is confined between the handle 8 and the shoulder formed by the upper end of the screw-threaded portion of the stem. This sleeve fits snugly within the upper end of the cap D, so as to exclude foreign matter and obviate the formation of a space. It will be understood that the screw-joint 9 is entirely isolated from the water or fluid passing through the valve-body. Hence should the same contain any grit the latter is prevented from finding its way into the joint and producing a grinding or abrasive action between the moving parts, which would tend to shorten the period of usefulness of the faucet. Moreover, it is possible to lubricate the complementary screw-threads, since such lubricant cannot contaminate the water or other substance passing through the valve.

In the type of valve shown in Fig. 5 the stem 5 is provided with a shoulder or collar 7, which engages with the upper end of the chamber 10 formed in the lower portion of the cap D and prevents vertical displacement of the stem. The valve 4 is formed with a tubular extension 11, mounted to reciprocate in the chamber 10 and held from turning by means of a vertical groove 12, formed in one side, and a screw or pin 13, entering said groove and passing through a side of the pendent portion of the cap D. This valve extension 11 is internally threaded to match the threaded portion of the stem 5, and when the latter is rotated the valve is either seated or unseated, according to the direction of rotation of the handle 8. The sleeve E is confined between the upper end of the cap D and the handle 8 and prevents downward movement of the valve-stem 5.

The plug-valve A is placed in position through the upper open end of the valve-chamber 2 and when worn can be replaced at a nominal cost and is adapted to be removed to admit of the seat for the valve 4 being trued in a lathe should it become worn or injured from any cause. Should the pressure in the service-pipe cause a greater flow than is desirable through the faucet when the latter is opened to its fullest capacity, the plug-valve A can be turned so as to cut off a part of the supply by causing the opening O to register more or less with the eduction-outlet of the shank or stem of the valve, as will be readily comprehended. When it is required to pack the valve, the part A can be turned to entirely shut off the passage of the water or fluid through the valve, thereby permitting the cap or closure D and the parts attached thereto being removed. The construction is such as to admit of the valve body or shell being constructed of comparatively cheap metal and the part A of best quality of metal to withstand wear, or by comparison the body can be made of comparatively expensive material and the part A of cheaper material; hence the advantage of having the part A separable from the casing. By having the lower end of the valve-chamber 2 smaller than the upper portion the force exerted to hold the valve 4 seated also tends to hold the part A in position and can be utilized to force the plug-valve home when assembling the parts. If preferred, a packing or gasket may be interposed between the washer B and the plug-valve A or between said washer and the valve-body in order to prevent any possible leak.

Having thus described the invention, what is claimed as new is—

1. In a faucet, cock or the like, a casing having a valve-chamber, a valve-seat removably fitted within the valve-chamber, a closure for the open end of said valve-chamber and having a tubular extension, a valve having a tubular extension telescoping with the tubular extension of the closure and held from turning therein, a stem rotatably fitted within the aforesaid closure and held against outward movement by a collar, and having its lower end threaded to coöperate with a threaded opening in the valve extension, and a packing-gland applied to the extension of the said closure and forming a tight joint with the tubular extension of the valve, substantially as set forth.

2. In a faucet, cock or the like, a casing having a valve-chamber, with its lower end portion made tapering, a plug-valve removably fitted within the valve-chamber through the upper end thereof and having its lower end reduced, a washer secured to the projecting part of the reduced portion of the plug-valve and overlapping the lower end of the valve-chamber and formed with an angular portion to receive a tool when it is required to turn the plug, a cap fitted to and closing the upper end of the valve-chamber and having a tubular extension, a stem mounted in the said cap, a valve controlled in its movements by the said stem, a packing-gland fitted to the lower end of the extension of the cap, and a sleeve fitted to the upper portion of the said stem and held in place by the handle fitted thereto, substantially as set forth.

In testimony whereof I affix my signature in presence of two witnesses.

EDWIN L. WALTER. [L. S.]

Witnesses:
GENEVIEVE MATTHEWS,
V. B. HILLYARD.